No. 776,113. PATENTED NOV. 29, 1904.
H. O. CLARK.
GOLD SAVING APPARATUS.
APPLICATION FILED JAN. 15, 1904.
NO MODEL.

Witnesses:
F. C. Fliedner
J. Krouse

Inventor:
Horace O. Clark
By Geo. H. Strong.
Atty.

No. 776,113. Patented November 29, 1904.

UNITED STATES PATENT OFFICE.

HORACE O. CLARK, OF SAN FRANCISCO, CALIFORNIA.

GOLD-SAVING APPARATUS.

SPECIFICATION forming part of Letters Patent No. 776,113, dated November 29, 1904.

Application filed January 15, 1904. Serial No. 189,130. (No model.)

*To all whom it may concern:*

Be it known that I, HORACE O. CLARK, a citizen of the United States, residing at the city and in the county of San Francisco and State of California, have invented new and useful Improvements in Gold-Saving Apparatus, of which the following is a specification.

My invention relates to improvements in gold-saving apparatus of the type known as "dry washers." Its object is to provide a simple, compact, and practical apparatus for working auriferous gravels and earths without the use of water.

There are many localities where gold exits in considerable quantities, but owing to the scarcity of water it is impossible under ordinary methods to separate it from the sand and gravel with which it is intermixed.

My invention consists of the parts and the construction and combination of parts, as hereinafter more fully described, having reference to the accompanying drawings, in which—

Figure 1:
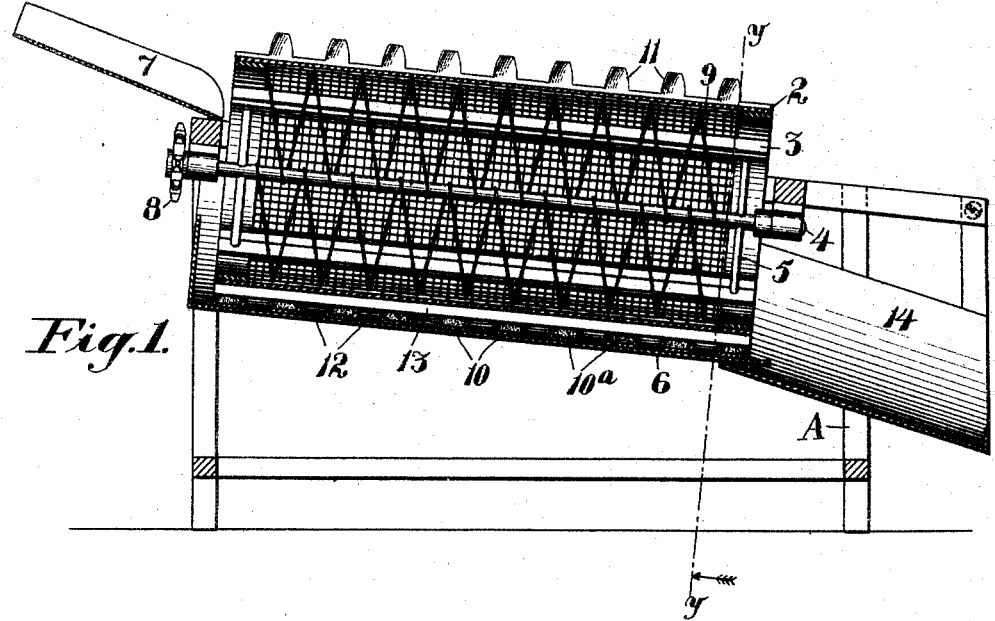
Figures 2, 3:
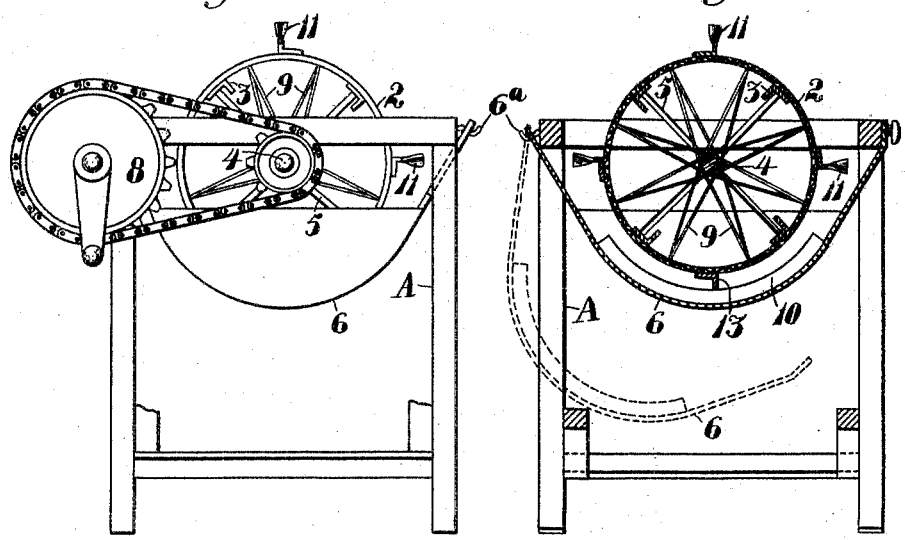

Figure 1 is a longitudinal vertical section of my apparatus. Fig. 2 is an end view of same omitting the spout. Fig. 3 is a section taken on line $y\,y$ of Fig. 1.

A represents a suitable framework in which is journaled the inclined foraminous drum or cylinder 2. The latter is open at both ends and is preferably made of heavy wire-netting stretched around a skeleton work of longitudinally-disposed angle-iron strips 3, supported from the drum-shaft 4 by the rods 5. The interstices of the netting are such as to allow only sands and finer gravels to pass through into an inclined trough 6 below and concentric with the drum. This trough is hinged at one side, as at $6^a$, to allow it to be swung down in the position of the dotted lines, Fig 3, whenever a clean up is necessary.

The material to be treated is fed into the drum at its upper end through a chute 7. The drum being revolved by any suitable means, as shown at 8, the contained sand, gravel, and earth are subjected to a severe agitation, the process of disintegration being assisted by the longitudinal baffles formed by the intruding parts of the strips 3, and especially by the radial lacework of steel wires 9 disposed throughout the length of the drum. The rocks and coarser gravel are discharged at the lower end of the drum, while the finer and precious materials gradually work down through the mass and pass through the netting into and between the segmental riffles 10 in trough 6. One of the chief claims to novelty resides in the construction of this trough and its riffles and in the mode in which the drum coacts with these riffles to carry the material and further to separate the more precious from the baser particles.

The riffles 10 are here shown as comprising pieces of channel-iron bent into segments concentric with drum A and secured to trough 6 equidistant from and parallel to each other. Alternate riffle-spaces are adapted to contain quicksilver, as indicated at $10^a$. The outside of the drum carries a series of projections 11, arranged to traverse the interspaces 12 between the quicksilver-containing riffles. The drum also carries a peripheral scraper 13, which extends the length of the drum, but only engages the tops of the riffles. The width of the projections 11 is substantially equal to the width of the interspaces 12, and the projections are curved more or less like vanes or propeller-blades, so that when they are moved through the spaces 12 they will act to push and turn the material ahead of them over upon the next lower quicksilver-containing riffle.

The scraper 13 moving in an arc essentially tangential to the riffles and assisted by the incline of the drum and trough pushes the material from them on downward into the succeeding lower interspaces, and so through the machine, the constant rotation of the drum and the successive actions of the projections and scraper gradually advancing all the material from the upper end of the trough downward through the interspaces and over the riffles into intimate contact with the various quicksilver areas, collecting the gold in the form of amalgam and finally discharging the dry barren sands and dust upon an inclined chute 14, which may also be riffled, if desired, and the riffle space or spaces filled with quicksilver. Thus the material is carried through the entire machine by gravity and the turning action of the drum. No water is needed, since the pulverizing of the material is complete by reason of the baffles 3, the lacework 9, and the juxtaposition of the trough and drum, which act upon one another further to grind and break up the material and since the action of the projections and scraper is to bring everything that falls through the drum into contact with the mercury. The action of the scraper 13 is important, moreover, in that at each rotation of the drum it cleans off the surface of the liquid and leaves it bright. When it is desired to "clean up," the drum is stopped and the trough 6 dropped down into the position shown in dotted lines, which allows the quicksilver and values to run into a pan or receptacle suitably held for the purpose.

Having thus described my invention, what I claim, and desire to secure by Letters Patent, is—

1. In a gold-washer, the combination of a revoluble, foraminous cylinder; a trough below the cylinder and provided with parallel riffles arranged substantially concentric with the cylinder, and scrapers on the cylinder each operating in one of the spaces between adjacent mercury-containing riffles and adapted to remove the material from said space for advancement to the succeeding mercury-containing riffle.

2. In a gold-washer, the combination of an inclined, foraminous, hollow cylinder open at the ends; a trough below the cylinder and having spaced, mercury-containing, riffles substantially conforming to the curvature of the cylinder; and spaced projections on the periphery of the cylinder adapted to traverse the spaces between the mercury-containing riffle to remove the material from said spaces and advance it to the succeeding mercury-containing riffles.

3. In a gold-washer, the combination of an inclined rotary hollow foraminous cylinder, a trough below and concentric with said cylinder, segmental riffles in said trough, and peripheral projections on the cylinder engaging certain of said riffle-interspaces.

4. In a gold-washer, the combination of an inclined rotary hollow foraminous cylinder, a trough below and concentric with said cylinder, segmental riffles in said trough, peripheral projections on the cylinder engaging certain of said riffle-interspaces, and a peripheral scraper on the cylinder engaging the riffles and describing an arc of lesser radius than the said peripheral projections.

5. In a gold-washer, the combination of an inclined, rotary, hollow, foraminous cylinder, a trough below and concentric with said cylinder, segmental riffles in said trough, peripheral projections on the cylinder engaging alternate riffle-interspaces and a peripheral scraper on the cylinder describing an arc substantially tangential to the riffles.

6. In a gold-washer, the combination of an inclined rotary hollow foraminous cylinder or drum, a trough below and concentric with said drum, segmental riffles in said trough, peripheral projections on the drum and disposed in planes transverse to the axis of the drum, said projections engaging alternate riffle-interspaces, and a peripheral scraper on the drum describing an arc substantially tangential to the riffles.

7. In a gold-washer, the combination of an inclined rotary hollow foraminous cylinder open at the ends, a hinged trough beneath and concentric with said cylinder, spaced segmental riffles on said hinged trough, said riffles adapted to contain mercury, and peripheral projections on the cylinder engaging the riffle-spaces intermediate of the mercury-containing riffles.

In testimony whereof I have hereunto set my hand in presence of two subscribing witnesses.

HORACE O. CLARK.

Witnesses:
HENRY P. TRICOU,
S. H. NOURSE.